(12) United States Patent
Izawa et al.

(10) Patent No.: US 11,448,911 B2
(45) Date of Patent: Sep. 20, 2022

(54) METHOD OF SETTING COMMON ELECTRODE VOLTAGE OF LIQUID CRYSTAL DISPLAY PANEL, AND LIQUID CRYSTAL MODULE

(71) Applicants: Panasonic Liquid Crystal Display Co., Ltd., Himeji (JP); Pasona Knowledge Partner Inc., Osaka (JP)

(72) Inventors: Keisuke Izawa, Osaka (JP); Makoto Arita, Hyogo (JP); Toshitaka Uchikoba, Hyogo (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 17/374,658

(22) Filed: Jul. 13, 2021

(65) Prior Publication Data

US 2022/0019100 A1 Jan. 20, 2022

(30) Foreign Application Priority Data

Jul. 14, 2020 (JP) .............................. JP2020-120493

(51) Int. Cl.
*G02F 1/133* (2006.01)
*G02F 1/1347* (2006.01)
*G02F 1/1337* (2006.01)

(52) U.S. Cl.
CPC ........ *G02F 1/13306* (2013.01); *G02F 1/1337* (2013.01); *G02F 1/1347* (2013.01)

(58) Field of Classification Search
CPC ... G02F 1/13306; G02F 1/1337; G02F 1/1347
USPC .......................................................... 349/40
See application file for complete search history.

(56) References Cited

U.S. PATENT DOCUMENTS

2012/0062527 A1* 3/2012 Cheong ................. G02F 1/1347
345/204

FOREIGN PATENT DOCUMENTS

JP H10-246789 9/1998

* cited by examiner

*Primary Examiner* — Nathanael R Briggs
*Assistant Examiner* — William D Peterson
(74) *Attorney, Agent, or Firm* — Hamre, Schumann, Mueller & Larson, P.C.

(57) ABSTRACT

A method of setting a common electrode voltage of a liquid crystal display panel in a liquid crystal module is provided. The liquid crystal module includes the liquid crystal display panel including an alignment film, and a backlight disposed behind the liquid crystal display panel. The method of setting a common electrode voltage of a liquid crystal display panel includes: eliminating an electric charge of the alignment film by turning on the backlight without driving the liquid crystal display panel to emit light of the backlight onto the liquid crystal display panel; and setting the common electrode voltage of the liquid crystal display panel by adjusting the common electrode voltage, after the eliminating of the electric charge.

6 Claims, 10 Drawing Sheets

METHOD OF SETTING COMMON ELECTRODE VOLTAGE OF LIQUID CRYSTAL DISPLAY PANEL, AND LIQUID CRYSTAL MODULE

CROSS REFERENCE TO RELATED APPLICATION

The present application is based on and claims priority of Japanese Patent Application No. 2020-120493 filed on Jul. 14, 2020. The entire disclosure of the above-identified application, including the specification, drawings and claims is incorporated herein by reference in its entirety.

FIELD

The present disclosure relates to a method of setting a common electrode voltage of a liquid crystal display panel and a liquid crystal module including the liquid crystal display panel.

BACKGROUND

Liquid crystal display panels have excellent characteristics, such as low profile, light weight, and low power consumption. Therefore, liquid crystal display devices having liquid crystal display panels are widely used in various applications. For example, liquid crystal display devices are used for television sets, monitors, tablet terminals or the like, or digital signage in public spaces of railway infrastructure or the like or in commercial facilities.

Such a liquid crystal display device has a liquid crystal display panel and a backlight. The liquid crystal display panel and the backlight are incorporated in the liquid crystal display device as a liquid crystal module.

As a liquid crystal display panel incorporated in a liquid crystal display device, a liquid crystal display panel of the active matrix driving type that has a plurality of thin film transistors (TFTs) is known. The liquid crystal display panel of the active matrix driving type includes a TFT substrate on which a TFT is provided as a switching element for each pixel, an opposed substrate that is opposed to the TFT substrate, a liquid crystal layer disposed between the TFT substrate and the opposed substrate, and an alignment film for controlling the initial orientation angles of liquid crystal molecules of the liquid crystal layer. The TFT substrate has a pixel electrode formed for each pixel, and a common electrode opposed to the pixel electrodes.

With the liquid crystal display panel configured as described above, when the TFT for each pixel is turned on, a voltage for driving the liquid crystal of the liquid crystal layer is applied to the pixel electrode, while a fixed constant voltage is applied to the common electrode. Specifically, a voltage responsive to a video signal is applied to the pixel electrode, and a common electrode voltage (Vcom), which is a fixed constant voltage, is applied to the common electrode.

When the liquid crystal display panel is driven in this way, flickering, which is referred to as flicker, may occur on the screen. Conventionally, before shipment of each liquid crystal display panel from the factory, the common electrode voltage is adjusted so that the flicker is minimized, thereby setting an optimal common electrode voltage for the liquid crystal display panel (PTL 1, for example).

CITATION LIST

Patent Literature

PTL 1: Japanese Unexamined Patent Application Publication No. H10-246789

SUMMARY

Technical Problem

However, the inventors have found that, even if the common electrode voltage should have been optimally set so that the flicker is minimized, the set common electrode voltage may not actually be the optimal common electrode voltage, and the common electrode voltage at which the flicker is minimized may be shifted with time.

The inventors have earnestly studied the cause of this and found that electric charges are accumulated in the alignment film because of static electricity produced during the manufacturing process for the liquid crystal display panel, for example, and the common electrode voltage (set Vcom) set so as to minimize the flicker deviates from the true optimal common electrode voltage (optimal Vcom) because of the electric charges. Specifically, if the common electrode voltage is set in a state where electric charges are accumulated in the alignment film, as shown in FIG. 11, the set common electrode voltage (set Vcom) is different from the true optimal common electrode voltage (optimal Vcom) set in a state where no electric charges are accumulated in the alignment film.

If the set Vcom and the optimal Vcom differ, the common electrode voltage at which the flicker is minimized is shifted when the liquid crystal display panel is driven. Specifically, as shown in FIG. 12, the common electrode voltage at which the flicker is minimized in the current state assumes a value between the set Vcom and the optimal Vcom, and the common electrode voltage is gradually shifted toward the optimal Vcom when the power is turned off, and is gradually shifted toward the set Vcom when the power is turned on. For example, the common electrode voltage at which the flicker is minimized in the current state is shifted to the optimal Vcom over about 1 week when the power is turned off, and is shifted to the set Vcom over 1 hour when the power is turned on.

The present disclosure is conceived to solve the problem described above, and has as an object to provide a method of setting a common electrode voltage of a liquid crystal display panel, a liquid crystal module and the like that can prevent a shift of the common electrode voltage at which the flicker is minimized.

Solution to Problem

A method of setting a common electrode voltage of a liquid crystal display panel according to an aspect of the present disclosure is a method of setting a common electrode voltage of a liquid crystal display panel in a liquid crystal module, the liquid crystal module including: the liquid crystal display panel including an alignment film; and a backlight disposed behind the liquid crystal display panel, the method including: eliminating an electric charge of the alignment film by turning on the backlight without driving the liquid crystal display panel to emit light of the backlight onto the liquid crystal display panel; and setting the common electrode voltage of the liquid crystal display panel by adjusting the common electrode voltage, after the eliminating of the electric charge.

A liquid crystal module according to an aspect of the present disclosure includes: a first liquid crystal display panel including an alignment film; a second liquid crystal display panel disposed behind the first liquid crystal display panel and including an alignment film; a backlight disposed behind the second liquid crystal display panel; and a driving circuit capable of driving only the second liquid crystal display panel out of the first liquid crystal display panel and the second liquid crystal display panel, wherein, when eliminating an electric charge of the alignment film of the first liquid crystal display panel by emitting light of the backlight onto the first liquid crystal display panel, the driving circuit drives the second liquid crystal display panel so that the second liquid crystal display panel performs white display.

Advantageous Effects

The present disclosure can prevent the common electrode voltage at which the flicker is minimized from shifting.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Exemplary embodiments of the present disclosure will be described below. It should be noted that each of the subsequently described embodiments shows one specific example of the present disclosure. The numerical values, shapes, materials, structural components, the arrangement and connection of the structural components, steps, the processing order of the steps, etc., shown in the following embodiments are mere examples, and thus are not intended to limit the present disclosure. Therefore, among the structural components described in the following embodiments, structural components not recited in any one of the independent claims that indicate the broadest concepts are described as optional structural components.

Each of the figures is a schematic diagram, and is not necessarily a precise illustration. Therefore, the scales in the respective figures are not necessarily uniform. It should be noted that, in the figures, components that are substantially the same are given the same numerical signs, and overlapping description may be omitted or simplified.

Embodiment 1

Figure 1:
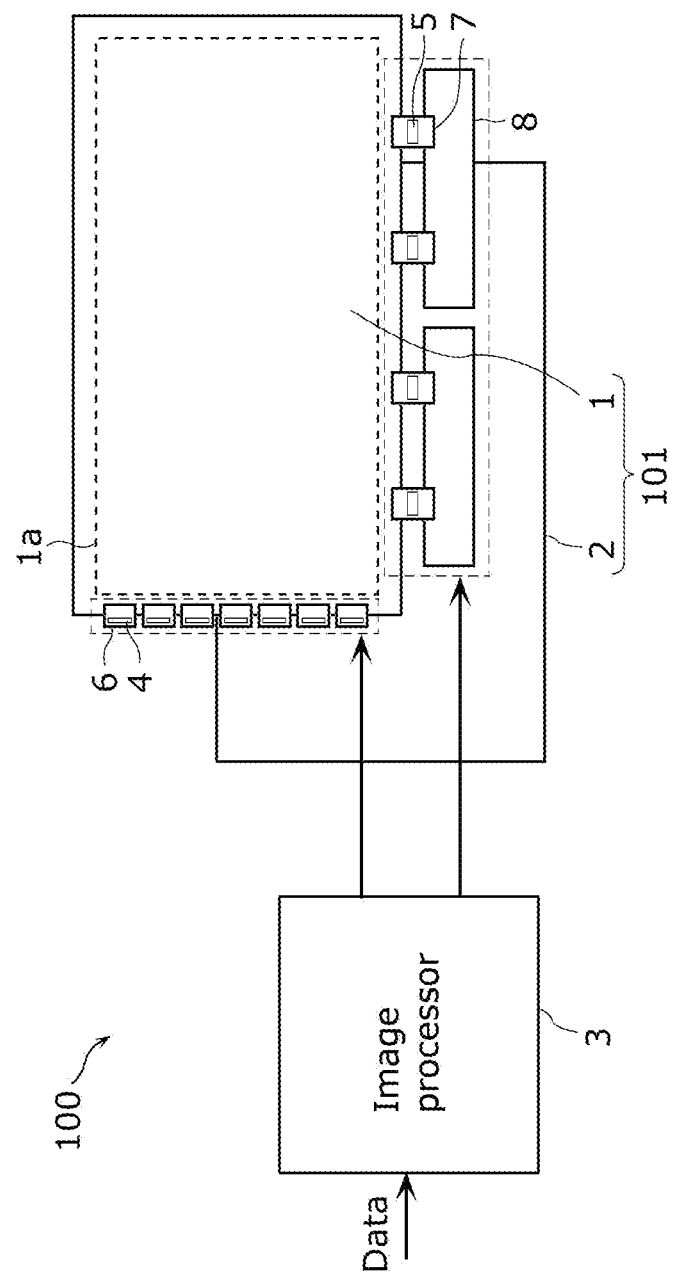
FIG. 1 is a diagram illustrating an outline configuration of a liquid crystal display device according to Embodiment 1.
Figure 2:
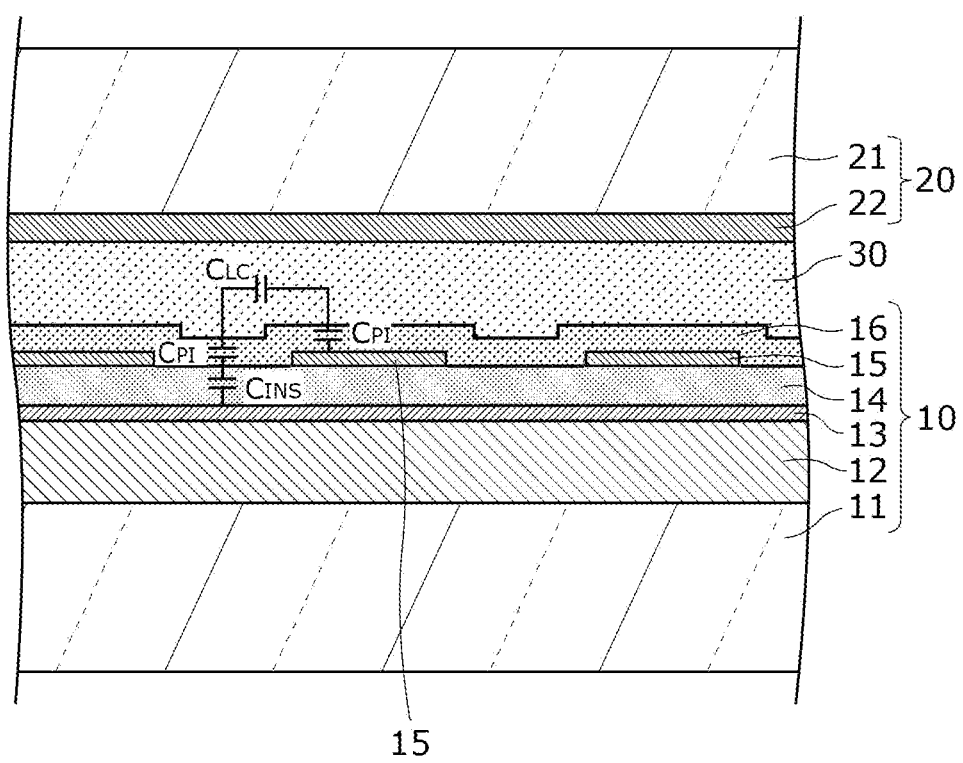
FIG. 2 is a partial cross-sectional view of a liquid crystal display panel used in the liquid crystal display device according to Embodiment 1.

First, a configuration of liquid crystal display device 100 according to Embodiment 1 will be described with reference to FIG. 1 and FIG. 2. FIG. 1 is a diagram illustrating an outline configuration of liquid crystal display device 100 according to Embodiment 1. FIG. 2 is a partial cross-sectional view of liquid crystal display panel 1 of liquid crystal display device 100.

Liquid crystal display device 100 is an image display device that displays an image, and includes liquid crystal display panel 1, backlight 2, and image processor 3 as shown in FIG. 1. Liquid crystal display panel 1 and backlight 2 are integrated as liquid crystal module 101 and incorporated in liquid crystal display device 100.

Liquid crystal display panel 1 is disposed on a light-emitting side of backlight 2. Therefore, light emitted by backlight 2 is incident on liquid crystal display panel 1. Liquid crystal display panel 1 displays an image (video), such as a still image or a moving image, with the incident light from backlight 2. Specifically, liquid crystal display panel 1 displays a color image or a monochromatic image. In this embodiment, liquid crystal display panel 1 displays a color image.

Note that, although the driving mode of liquid crystal display panel 1 is the horizontal electric field mode, such as the In Plane Switching (IPS) mode or the Fringe Field Switching (FFS) mode, the Vertical Alignment (VA) mode or the Twisted Nematic (TN) mode can also be used, for example. Voltage control of Liquid crystal display panel 1, which is of the horizontal electric field mode, is performed in the normally black mode, for example. However, the mode of voltage control of liquid crystal display panel 1 is not limited to the normally black mode.

Image display area 1a of liquid crystal display panel 1 is a display area (effective area) in which an image is displayed, and is formed by a plurality of pixels arranged in a matrix, for example. Image display area 1a is a rectangular area, for example. In this embodiment, since liquid crystal display panel 1 displays a color image, the plurality of pixels in image display area 1a include a red pixel, a green pixel, and a blue pixel. Note that the display screen includes a frame area (peripheral area) having a rectangular frame shape that surrounds image display area 1a as an ineffective area in which no image is displayed.

Liquid crystal display panel 1 includes gate driver 4 and source driver 5 in order to display a color image responsive to an input video signal in image display area 1a.

Specifically, gate wiring substrate 6 on which gate driver 4 is mounted and source wiring substrate 7 on which source driver 5 is mounted are connected to a liquid crystal cell of liquid crystal display panel 1. Gate wiring substrate 6 and source wiring substrate 7 are flexible printed circuits (FPCs), for example. Note that circuit substrate 8 on which a plurality of electronic components are mounted is connected to a part of source wiring substrate 7 on the opposite side to liquid crystal display panel 1.

Gate driver 4 is connected to a plurality of gate wires formed on liquid crystal display panel 1. Gate driver 4 selects a gate wire in response to a timing signal input from image processor 3, and applies a voltage for turning on a TFT to the selected gate wire.

Source driver 5 is connected to a plurality of source wires formed on liquid crystal display panel 1. In response to a gate wire being selected by gate driver 4, source driver 5 applies, to the TFT connected to the selected gate wire, a voltage responsive to a video signal that indicates a gray scale value of each pixel. In this way, a video signal is written to the pixel corresponding to the selected gate wire.

Note that image processor 3 receives input video signal Data transmitted from an outside system (not shown), performs various image signal processing such as color adjustment, then generates a video signal that indicates a gray scale value of each pixel and outputs the video signal to source driver 5, and outputs a timing signal responsive to the video signal to gate driver 4.

As shown in FIG. 2, liquid crystal display panel 1 includes first substrate 10, second substrate 20 opposed to first substrate 10, and liquid crystal layer 30 disposed between first substrate 10 and second substrate 20. First substrate 10, second substrate 20, and liquid crystal layer 30 disposed therebetween form a liquid crystal cell.

For example, first substrate 10 is disposed on the rear side, which is the side toward backlight 2, and second substrate 20 is disposed on the front side. Note that second substrate 20 may be disposed on the rear side, and first substrate 10 may be disposed on the front side.

First substrate 10 is a TFT substrate on which a plurality of TFTs are formed. Specifically, first substrate 10 includes first transparent substrate 11, wiring layer 12, common electrode 13, insulating layer 14, pixel electrode 15, and alignment film 16.

First transparent substrate 11 is a transparent base material, such as a glass substrate or a transparent resin substrate. In this embodiment, first transparent substrate 11 is a glass substrate.

Wiring layer 12 is formed on first transparent substrate 11. Specifically, wiring layer 12 is formed on a principal plane of first transparent substrate 11 on the side toward liquid crystal layer 30. Wiring layer 12 includes a TFT disposed for each of the plurality of pixels, and various kinds of wiring for driving the TFTs. In wiring layer 12, for example, a plurality of gate wires and a plurality of source wires perpendicular to the plurality of gate wires are formed as the wiring. Wiring layer 12 includes a plurality of metal layers in which wires made of a metal material are formed, and a plurality of interlayer insulating layers formed between the plurality of metal layers. At the top of wiring layer 12, a planarized film is formed as one of the interlayer insulating layers.

Common electrode 13 is formed on the planarized film at the top of wiring layer 12. Common electrode 13 is an electrode common to all pixels. Specifically, common electrode 13 is a single planar electrode formed over all the pixels. Common electrode 13 is an opposed electrode that is opposed to pixel electrode 15. In this embodiment, common electrode 13 is opposed to pixel electrode 15 with insulating layer 14 interposed therebetween. The common electrode is a transparent electrode made of indium tin oxide (ITO), for example.

Insulating layer 14 is formed on common electrode 13. Specifically, insulating layer 14 is formed to cover common electrode 13. Insulating layer 14 may be made of inorganic material or organic material.

Pixel electrode 15 is formed on insulating layer 14. Pixel electrode 15 is formed for each pixel. Pixel electrode 15 is a transparent electrode made of ITO, for example.

Pixel electrode 15 and common electrode 13 are electrodes for applying a voltage to liquid crystal layer 30. Specifically, a voltage (data voltage) responsive to a video signal is applied to pixel electrode 15, and a common electrode voltage (Vcom), which is a fixed constant voltage, is applied to the common electrode.

Alignment film 16 is formed on pixel electrodes 15. Specifically, alignment film 16 is formed over all pixels to cover all pixel electrodes 15. Alignment film 16 is in contact with liquid crystal layer 30, and controls initial orientation angles of liquid crystal molecules of liquid crystal layer 30. In this embodiment, in order to align the initial orientation angles of the liquid crystal molecules in one direction, alignment film 16 has been subjected to a rubbing process. Alignment film 16 is made of a transparent resin material, for example. In this embodiment, alignment film 16 is made of polyimide resin. Note that alignment film 16 may be formed in the photo-alignment method.

Second substrate 20 is an opposed substrate disposed to be opposed to first substrate 10. In this embodiment, since liquid crystal display panel 1 displays a color image, second substrate 20 is a color filter substrate (CF substrate) on which a color filter is formed. Specifically, as shown in FIG. 2, second substrate 20 includes second transparent substrate 21 and color filter layer 22 formed on second transparent substrate 21. Color filter layer 22 is formed on a principal plane of second transparent substrate 21 that is on the side toward liquid crystal layer 30.

Second transparent substrate 21 is a transparent base material, such as a glass substrate or a transparent resin substrate. In this embodiment, second transparent substrate 21 is a glass substrate, as with first transparent substrate 11.

Color filter layer 22 has a color filter and a black matrix. The black matrix is a black light-shielding layer formed between the pixels, and is made of carbon black, for example. The color filter is formed for each of the plurality of pixels. Specifically, as the color filters, a red color filter, a green color filter, and a blue color filter are formed for the red pixel, the green pixel, and the blue pixel, respectively. Each color filter is formed in an area surrounded by the black matrix (that is, in an opening in the black matrix).

Liquid crystal layer 30 is sealed in between first substrate 10 and second substrate 20. Specifically, liquid crystal layer 30 is sealed by sealing member formed between first substrate 10 and second substrate 20. The sealing member sealing liquid crystal layer 30 is formed in a frame-like shape along the circumference of first substrate 10 and second substrate 20.

A liquid crystal material forming liquid crystal layer 30 can be appropriately selected according to the driving mode of liquid crystal display panel 1. The thickness of liquid crystal layer 30 is the distance (cell gap) between first substrate 10 and second substrate 20. The thickness of liquid crystal layer 30 is 2 μm to 6 μm, for example, although the thickness is not limited thereto.

Note that, although not shown, liquid crystal display panel 1 has a pair of polarizing plates. The pair of polarizing plates are disposed to sandwich a liquid crystal cell formed by first substrate 10, second substrate 20 and liquid crystal layer 30 disposed therebetween. One of the pair of polarizing plates is provided on first substrate 10, and the other of the pair of polarizing plates is provided on second substrate 20. Specifically, one of the pair of polarizing plate is bonded to an outer surface of first transparent substrate 11, and the other of the polarizing plates is bonded to an outer surface of second transparent substrate 21. The pair of polarizing plates are arranged with the directions of polarization thereof being perpendicular to each other. Note that a retardation plate may be bonded to the pair of polarizing plates.

Backlight 2 is disposed on the rear side of liquid crystal display panel 1 configured as described above. Specifically, backlight 2 is disposed on the side toward the rear surface of liquid crystal display panel 1 so as to be opposed to liquid crystal display panel 1. Backlight 2 emits light toward liquid crystal display panel 1. Specifically, backlight 2 emits white light as illumination light.

In this embodiment, backlight 2 is an LED backlight using a light emitting diode (LED) as a light source. Specifically, backlight 2 is a direct-type LED backlight having two-dimensionally arranged LED elements. Note that backlight 2 may be of the edge type, rather than the direct type. Backlight 2 may also be formed by a cold cathode tube or the like, rather than the LED.

For example, backlight 2 which is an LED backlight includes a mounting substrate such as a glass epoxy substrate and a plurality of LED elements arranged on the mounting substrate. The plurality of LED elements are two-dimensionally arranged on the mounting substrate. For example, the plurality of LED elements are arranged in a matrix at predetermined intervals along the horizontal lines of pixels (in the row direction) and the vertical lines of pixels (in the column direction) of liquid crystal display panel 1.

In this embodiment, backlight 2 is configured as a surface emitting unit that emits planar uniformly scattered (diffused) light to liquid crystal display panel 1. Therefore, backlight 2 has an optical sheet, such as a diffusion sheet, a prism sheet, or a polarizing sheet, to make the brightness of the light emitted by the plurality of LED elements uniform. Note that the optical sheet need not be a single sheet and may be formed by a plurality of sheets selected from among the prism sheet, the diffusion sheet, and the polarizing sheet.

Backlight 2 may be an LED backlight capable of local dimming for high dynamic range (HDR), for example. The local dimming is a technique of partitioning the whole of image display area 1a of liquid crystal display panel 1 into a plurality of display areas and partially adjusting the brightness of backlight 2 according to the image to be displayed in each partitioned display area. Specifically, the LED elements two-dimensionally arranged are divided into a plurality of light emitting areas to correspond to the partitioned display areas, and the amount of light emission of the LED elements in each light emitting area is adjusted according to the image to be displayed to change the brightness. That is, the plurality of LED elements of backlight 2 can be selectively made to emit light in synchronization with a video signal being written to each pixel of liquid crystal display panel 1. By performing a local dimming control with backlight 2 in this way, liquid crystal display device 100 can display a color image of high contrast and high quality.

Figure 3:
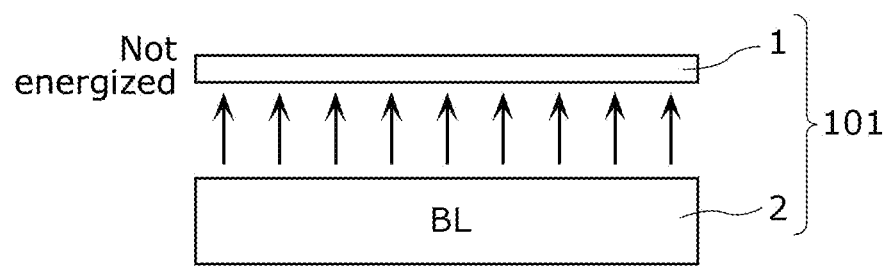
FIG. 3 is a diagram for illustrating a method of setting a common electrode voltage of a liquid crystal display panel according to Embodiment 1.
Figure 4:
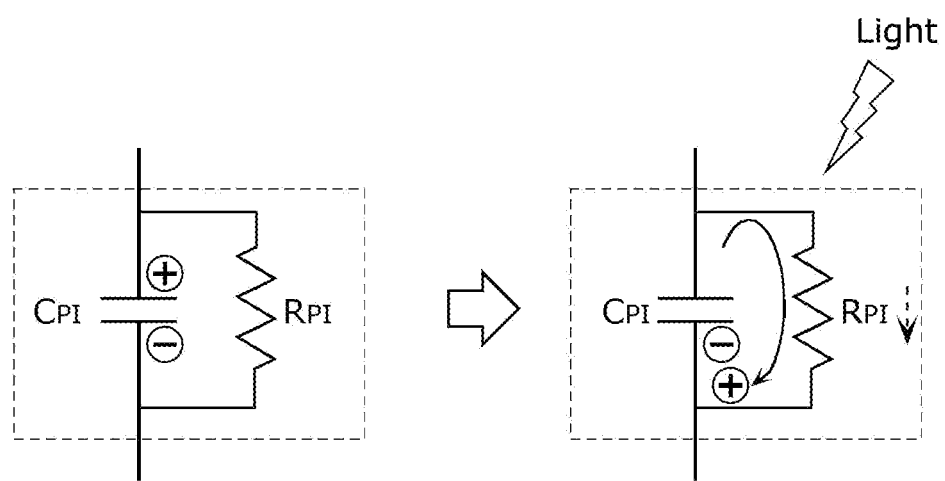
FIG. 4 is a diagram for illustrating a principle according to which an electric charge of an alignment film is eliminated when the alignment film is irradiated with light.

Next, a method of setting common electrode voltage Vcom of liquid crystal display panel 1 according to this embodiment, as well as the background of the technique according to the present disclosure, will be described with reference to FIG. 2 as well as FIG. 3 and FIG. 4. FIG. 3 is a diagram for illustrating a method of setting a common electrode voltage of liquid crystal display panel 1 according to Embodiment 1. FIG. 4 is a diagram for illustrating a principle according to which an electric charge of alignment film 16 is eliminated when alignment film 16 is irradiated with light.

As shown in FIG. 2, there is alignment film 16 between common electrode 13 and pixel electrode 15, and electric charges are accumulated in capacitance $C_{PI}$ of alignment film 16 because of static electricity produced during the manufacturing process for liquid crystal display panel 1, for example. The inventors have found that, if the common electrode voltage is set so as to minimize the flicker in a state where electric charges are accumulated in alignment film 16, the set common electrode voltage (set Vcom) deviates from the true optimal common electrode voltage (optimal Vcom) because of the electric charges accumulated in alignment film 16, and therefore, the common electrode voltage at which the flicker is minimized is shifted, as described above. The inventors have also found that the lower the resistance of alignment film 16, the quicker the shift of the common electrode voltage at which the flicker is minimized is.

The inventors have earnestly studied this problem and found that the shift of the common electrode voltage described above can be prevented by eliminating the electric charges accumulated in alignment film 16 before setting the common electrode voltage.

Specifically, a method of setting a common electrode voltage of liquid crystal display panel 1 according to this embodiment includes an electric charge eliminating step of eliminating an electric charge of alignment film 16, and a voltage setting step of setting a common electrode voltage of liquid crystal display panel 1 by adjusting the common electrode voltage after the electric charge eliminating step.

In the electric charge eliminating step of eliminating an electric charge of alignment film 16, as shown in FIG. 3, in liquid crystal module 101 including liquid crystal display panel 1 having alignment film 16 and backlight 2, an electric charge of alignment film 16 is eliminated by turning on backlight 2 in a state where liquid crystal display panel 1 is not driven (that is, in a state where liquid crystal display panel 1 is not energized), thereby irradiating liquid crystal display panel 1 with light of backlight 2.

Here, when alignment film 16 is irradiated with light, the electric resistance of alignment film 16 temporarily decreases. The electric resistance of alignment film 16 also varies with the amount of light. That is, while alignment film 16 is irradiated with light, the electric resistance of alignment film 16 substantially decreases.

Therefore, by irradiating liquid crystal display panel 1 with light of backlight 2 in a state where liquid crystal display panel 1 is not driven as described above, electric resistance $R_{PI}$ of alignment film 16 can be effectively reduced as shown in FIG. 4. In this way, electric charges accumulated in capacitance $C_{PI}$ of alignment film 16 can be eliminated in a short time. In addition, by using backlight 2 incorporated in liquid crystal module 101 to apply light, electric charges of alignment film 16 can be eliminated without using an additional light source. That is, electric charges of alignment film 16 can be eliminated with existing liquid crystal module 101.

Note that, if liquid crystal display panel 1 is irradiated with light of backlight 2 in a state where liquid crystal display panel 1 is driven to perform black display, electric charges accumulated in alignment film 16 cannot be eliminated.

For this reason, in this embodiment, liquid crystal display panel 1 is irradiated with light of backlight 2 by turning on only backlight 2 in a state where liquid crystal display panel 1 is not driven. In this case, backlight 2 is fully turned on so that all the LED elements emit light, with the maximum power for driving liquid crystal display panel 1. In this embodiment, the duration of the irradiation of liquid crystal display panel 1 with light of backlight 2 is 1 hour.

After electric charges of alignment film 16 are eliminated by irradiating liquid crystal display panel 1 with light of backlight 2, the common electrode voltage of liquid crystal display panel 1 is set by adjusting the common electrode voltage so that the flicker is minimized.

As described above, in the method of setting a common electrode voltage of liquid crystal display panel 1 according to this embodiment, the common electrode voltage of liquid crystal display panel 1 is set after electric charges of alignment film 16 are eliminated. In other words, before the common electrode voltage of liquid crystal display panel 1 is set, electric charges of alignment film 16 are eliminated.

In this way, the common electrode voltage (set Vcom) set so that the flicker is minimized and the true optimal common electrode voltage (optimal Vcom) can be made to agree with each other. Therefore, the shift of the common electrode voltage at which the flicker is minimized described above can be prevented.

Embodiment 2

Next, Embodiment 2 will be described. Although liquid crystal display device 100 and liquid crystal module 101 according to embodiment 1 described above has one liquid crystal display panel, liquid crystal display device 200 and liquid crystal module 201 according to Embodiment 2 have a plurality of liquid crystal display panels.

Figure 5:
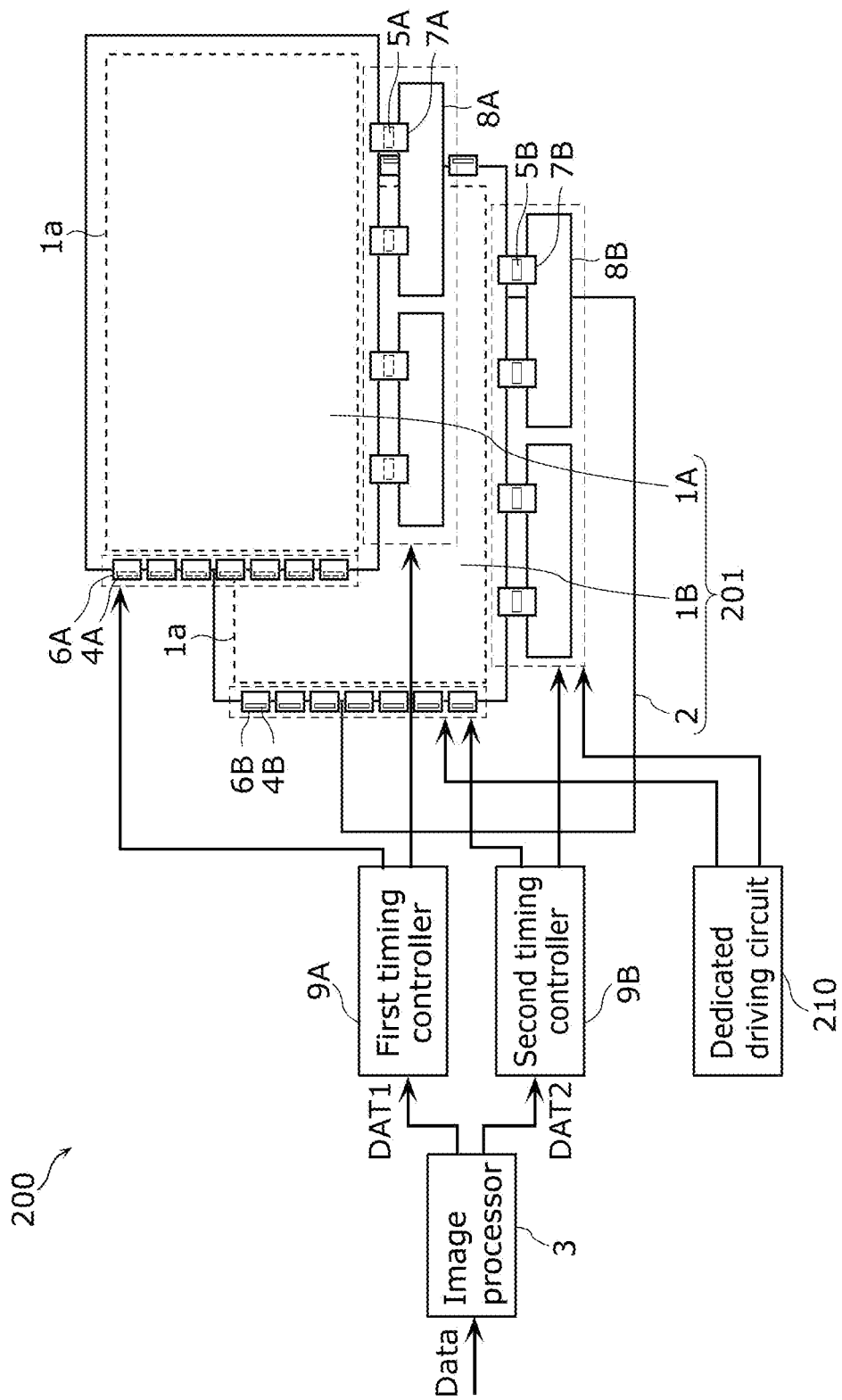
FIG. 5 is a diagram illustrating an outline configuration of a liquid crystal display device according to Embodiment 2.
Figure 6:
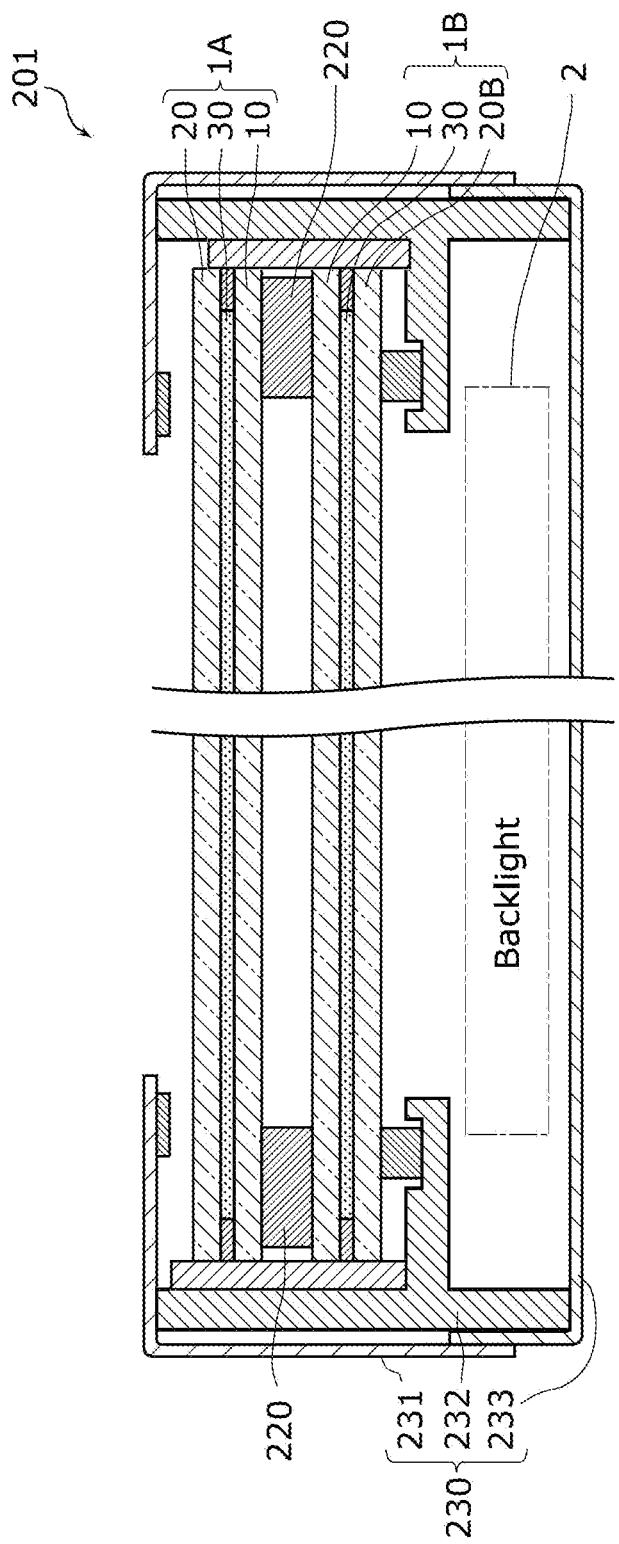
FIG. 6 is a cross-sectional view of a liquid crystal module of the liquid crystal display device according to Embodiment 2.

In the following, specific configurations of liquid crystal display device 200 and liquid crystal module 201 according to this embodiment will be described with reference to FIG. 5 and FIG. 6. FIG. 5 is a diagram illustrating an outline configuration of liquid crystal display device 200 according to Embodiment 2. FIG. 6 is a cross-sectional view of liquid crystal module 201 of liquid crystal display device 200 according to Embodiment 2.

Liquid crystal display device 200 according to this embodiment displays a color image, as with liquid crystal display device 100 according to the embodiment described above. As shown in FIG. 5, as a plurality of liquid crystal display panels, liquid crystal display device 200 according to this embodiment includes two liquid crystal display panels, specifically, first liquid crystal display panel 1A disposed on the side closer to an observer (front side) and second liquid crystal display panel 1B disposed on the rear side of first liquid crystal display panel 1A. Second liquid crystal display panel 1B is disposed between first liquid crystal display panel 1A and backlight 2. That is, backlight 2 is disposed on the rear side of second liquid crystal display panel 1B. In this way, first liquid crystal display panel 1A and second liquid crystal display panel 1B are disposed and overlaid on one another on the front side of backlight 2.

First liquid crystal display panel 1A is a main panel, and displays a color image. Second liquid crystal display panel 1B is a subpanel disposed on the rear side of first liquid crystal display panel 1A, and displays a monochromatic image (black and white image) corresponding to the color image displayed on first liquid crystal display panel 1A in synchronization with the color image.

First liquid crystal display panel 1A and second liquid crystal display panel 1B have basically the same configuration as liquid crystal display panel 1 according to Embodiment 1 described above.

Therefore, first liquid crystal display panel 1A includes first gate driver 4A and first source driver 5A in order to display a color image responsive to an input video signal in image display area 1a. Specifically, first gate wiring substrate 6A on which first gate driver 4A is mounted and first source wiring substrate 7A on which first source driver 5A is mounted are connected to first liquid crystal display panel 1A. Note that first circuit substrate 8A is connected to first source wiring substrate 7A. When displaying a color image in image display area 1a of first liquid crystal display panel 1A, various signals output from first timing controller 9A are input to first gate driver 4A and first source driver 5A.

Similarly, second liquid crystal display panel 1B includes second gate driver 4B and second source driver 5B in order to display a monochromatic image responsive to an input video signal in image display area 1a. Specifically, second gate wiring substrate 6B on which second gate driver 4B is mounted and second source wiring substrate 7B on which second source driver 5B is mounted are connected to second liquid crystal display panel 1B. Note that second circuit substrate 8B is connected to second source wiring substrate 7B. When displaying a monochromatic image in image display area 1a of second liquid crystal display panel 1B, various signals output from second timing controller 9B are input to second gate driver 4B and second source driver 5B.

Note that, although the driving mode of first liquid crystal display panel 1A and second liquid crystal display panel 1B is the horizontal electric field mode, such as the IPS mode or the FFS mode, as with liquid crystal display panel 1 according to Embodiment 1 described above, the VA mode or the TN mode can also be used, for example. Voltage control of first liquid crystal display panel 1A and second liquid crystal display panel 1B, which are of the horizontal electric field mode, is performed in the normally black mode, for example. However, the mode of voltage control of the liquid crystal display panels is not limited to the normally black mode.

Liquid crystal display device 200 according to this embodiment includes first timing controller 9A and second timing controller 9B. Image processor 3 outputs image data to first timing controller 9A and second timing controller 9B.

In this embodiment, image processor 3 receives input video signal Data transmitted from an outside system, performs various image signal processing such as color adjustment, then outputs first image data DAT1 to first timing controller 9A and outputs second image data DAT2 to second timing controller 9B. Image processor 3 also outputs a control signal, such as a synchronization signal, to first timing controller 9A and second timing controller 9B. First image data DAT1 is image data for color display, and second image data DAT2 is image data for monochromatic display.

With liquid crystal display device 200 according to this embodiment, an image is displayed on two liquid crystal display panels, first liquid crystal display panel 1A and second liquid crystal display panel 1B, overlaid on one another, and therefore, the black color can be darkened. Therefore, an image of high contrast ratio can be displayed.

Liquid crystal display device 200 according to this embodiment further includes dedicated driving circuit 210 capable of driving only second liquid crystal display panel 1B among first liquid crystal display panel 1A and second liquid crystal display panel 1B. Dedicated driving circuit 210 may be incorporated in liquid crystal module 201.

As shown in FIG. 6, first liquid crystal display panel 1A, second liquid crystal display panel 1B, and backlight 2 are integrated as liquid crystal module 201 and incorporated in liquid crystal display device 200. Note that backlight 2 in this embodiment is the same as that in Embodiment 1 described above.

First liquid crystal display panel 1A has the same configuration as liquid crystal display panel 1 according to Embodiment 1 described above. Specifically, the first liquid crystal display panel includes first substrate 10, which is a TFT substrate, second substrate 20 opposed to first substrate 10, and liquid crystal layer 30 disposed between first substrate 10 and second substrate 20. Note that, although first liquid crystal display panel 1A is arranged with second substrate 20 located on the front side of first substrate 10 in this embodiment, first liquid crystal display panel 1A may be arranged with first substrate 10, which is a TFT substrate, located on the front side of second substrate 20.

Second liquid crystal display panel 1B has basically the same configuration as liquid crystal display panel 1 according to Embodiment 1 described above. However, since second liquid crystal display panel 1B displays a monochromatic image, second substrate 20B of second liquid crystal display panel 1B does not have color filter layer 22 formed by a color filter and a black matrix, but has a black matrix layer, which does not include the color filter among the color filter and the black matrix, instead of color filter layer 22.

Note that, although second liquid crystal display panel 1B is arranged with first substrate 10, which is a TFT substrate, located on the front side of second substrate 20B in this embodiment, second liquid crystal display panel 1B may be arranged with second substrate 20B located on the front side of first substrate 10.

First liquid crystal display panel 1A and second liquid crystal display panel 1B are bonded to each other by bonding member 220. Bonding member 220 is a bonding tape, such as a double-sided tape.

First liquid crystal display panel 1A and second liquid crystal display panel 1B bonded by bonding member 220 and backlight 2 are held by frame 230. Frame 230 is configured of first frame 231, second frame 232, and third frame 233. First frame 231, second frame 232, and third frame 233 are fixed to each other with a screw, for example.

First frame 231 is a front frame located toward the front, and includes a bezel portion that covers a peripheral portion of first liquid crystal display panel 1A, and a side wall portion that extends from the bezel portion toward third frame 233. Second frame 232 is a middle frame disposed between first frame 231 and third frame 233, and supports first liquid crystal display panel 1A and second liquid crystal display panel 1B from the side of backlight 2. Third frame 233 is a rear frame positioned toward the rear, and holds backlight 2. Backlight 2 is disposed on third frame 233. Specifically, a mounting substrate on which a plurality of LED elements as backlight 2 are mounted is mounted and fixed on a bottom portion of third frame 233.

Next, a method of setting common electrode voltage Vcom of each of first liquid crystal display panel 1A and second liquid crystal display panel 1B, as well as the background of the technique according to the present disclosure, will be described.

As described above, if electric charges are accumulated in the alignment film because of static electricity produced during the manufacturing process for the liquid crystal display panel, the common electrode voltage (set Vcom) set to minimize the flicker deviates from the true optimal common electrode voltage (optimal Vcom), and the common electrode voltage at which the flicker is minimized is shifted.

In addition, since liquid crystal module 201 according to this embodiment has second liquid crystal display panel 1B that displays a monochromatic image in addition to first liquid crystal display panel 1A that displays a color image, image display area 1a of first liquid crystal display panel 1A is partially irradiated with the light of backlight 2 because of the presence of second liquid crystal display panel 1B that displays a monochromatic image. As a result, the inventors have found that, because of the partial shift of the common electrode voltage at which the flicker is minimized, the afterimage displayed on the liquid crystal display device is substantially worse on the liquid crystal display device having two liquid crystal display panels like the liquid crystal display device according to this embodiment than the liquid crystal display device having one liquid crystal display panel.

Figure 7:
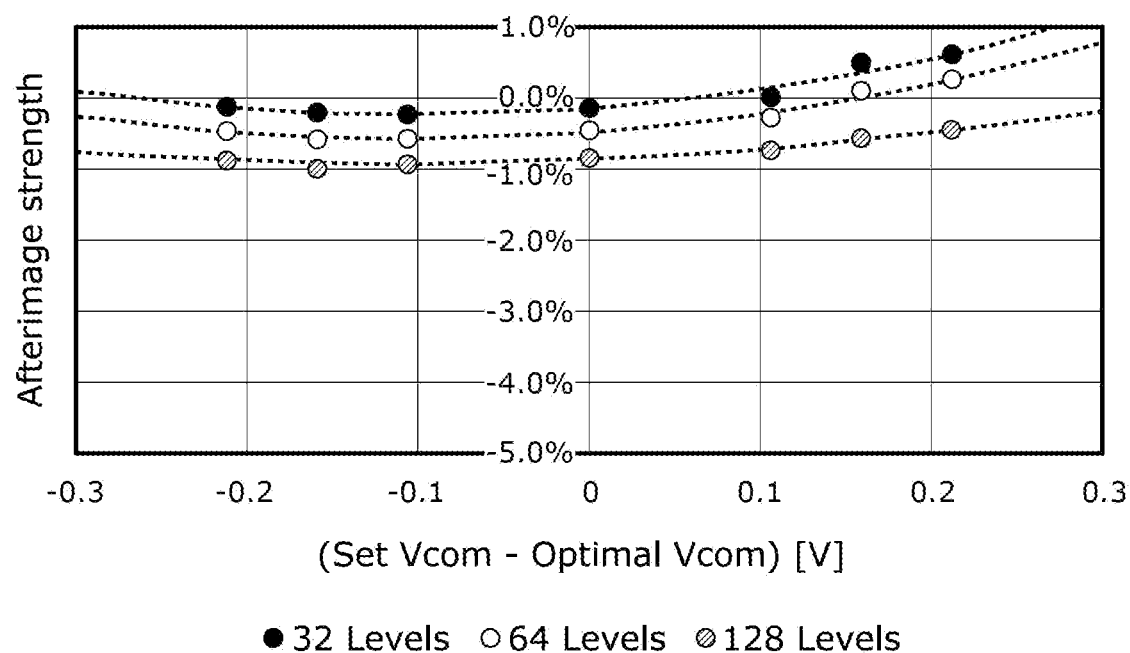
FIG. 7 is a graph showing a relationship between the difference between a set Vcom and an optimal Vcom and the afterimage strength for a liquid crystal display device having one liquid crystal display panel.
Figure 8:
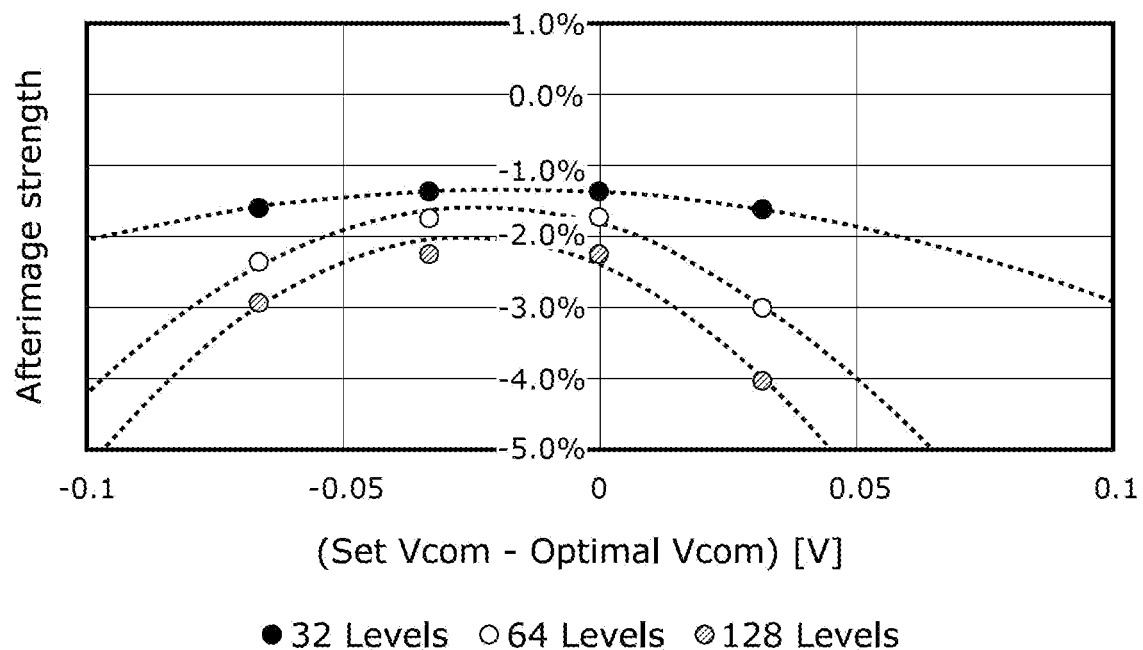
FIG. 8 is a graph showing a relationship between the difference between the set Vcom and the optimal Vcom and the afterimage strength for a liquid crystal display device having two liquid crystal display panels.

This will be described with reference to FIG. 7 and FIG. 8. FIG. 7 shows a relationship between the difference between the set Vcom and the optimal Vcom and the afterimage strength for a liquid crystal display device having one liquid crystal display panel (referred to as a "single-panel liquid crystal display device", hereinafter) like the liquid crystal display panel according to Embodiment 1, and FIG. 8 shows a relationship between the difference between the set Vcom and the optimal Vcom and the afterimage strength for a liquid crystal display device having two liquid crystal display panels (referred to as a "double-panel liquid crystal display device", hereinafter) like the liquid crystal display panel according to this embodiment. In FIG. 7 and FIG. 8, the horizontal axis indicates the difference (set Vcom−optimal Vcom) between the common electrode voltage (set Vcom) set to minimize the flicker and the true optimal common electrode voltage (optimal Vcom) for minimizing the flicker, and the vertical axis indicates the relative afterimage strength.

First, for the single-panel liquid crystal display device, a white display part and a black display part are irradiated with an equal amount of light from the backlight, the speed of the shift of the common electrode voltage at which the flicker is minimized is the same in the white display part and the black display part. As a result, as shown in FIG. 7, the afterimage is not so bad on the single-panel liquid crystal display device.

On the other hand, with the double-panel liquid crystal display device, the speed of the shift of the common electrode voltage at which the flicker is minimized is high in the white display area, and is low in the black display area. That is, with the double-panel liquid crystal display device, the speed of the shift of the common electrode voltage at which the flicker is minimized differs between the white display part and the black display part, and therefore, the common electrode voltage at which the flicker is minimized differs between the white display part and the black display part. As a result, the level of the flicker differs between the white display part and the black display part, and the afterimage is substantially worse than on the single-panel liquid crystal display device, as shown in FIG. 8.

As described above, the shift of the common electrode voltage at which the flicker is minimized has a substantially greater effect on the afterimage on the liquid crystal display panel (double-panel liquid crystal display device) having two liquid crystal display panels than on the afterimage on the liquid crystal display device (single-panel liquid crystal display device) having one liquid crystal display panel.

That is, taking measures against the shift of the common electrode voltage at which the flicker is minimized caused by the electric charges accumulated in alignment film 16 is more important for the liquid crystal display device having two liquid crystal display panels like liquid crystal display device 200 according to this embodiment than for the liquid crystal display device having one liquid crystal display panel.

In this embodiment, as in Embodiment 1 described above, electric charges of alignment film 16 can be eliminated before setting the common electrode voltage of liquid crystal display panel 1, in order to prevent the shift of the common electrode voltage at which the flicker is minimized. However, in this embodiment, since there is second liquid crystal display panel 1B between backlight 2 and first liquid crystal display panel 1A, electric charges of alignment film 16 of first liquid crystal display panel 1A cannot be eliminated in the manner according to Embodiment 1 described above.

The inventors have earnestly studied this problem and found a method of appropriately eliminating electric charges of alignment film 16 of each of two liquid crystal display panels, first liquid crystal display panel 1A and second liquid crystal display panel 1B, of liquid crystal module 201.

Specifically, in this embodiment, electric charges of alignment film 16 of first liquid crystal display panel 1A are eliminated by using dedicated driving circuit 210 capable of driving only second liquid crystal display panel 1B among first liquid crystal display panel 1A and second liquid crystal display panel 1B.

Figure 9:
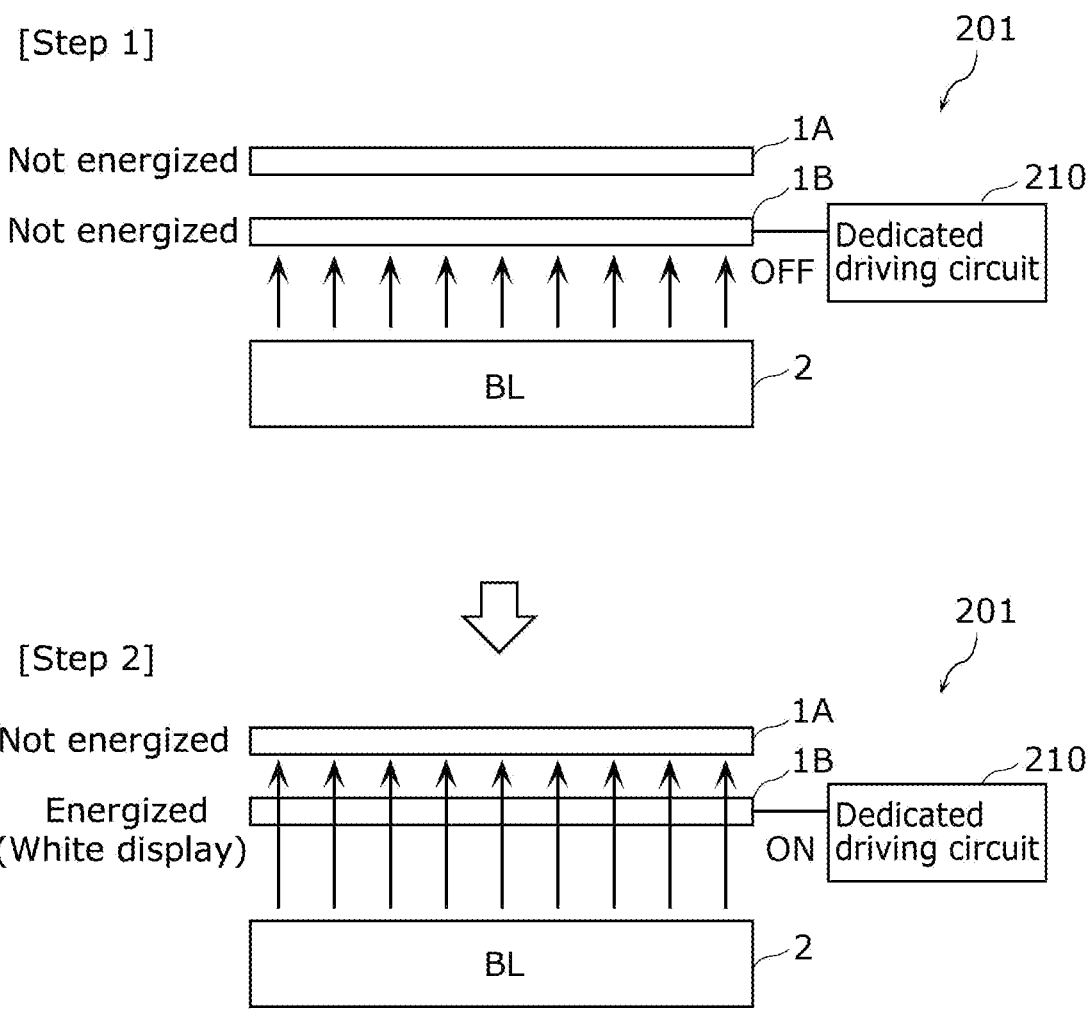
FIG. 9 is a diagram for illustrating an electric charge elimination step of eliminating an electric charge of an alignment film in a method of setting a common electrode voltage of each of a first liquid crystal display panel and a second liquid crystal display panel of a liquid crystal module according to Embodiment 2.

In the following, a method of setting the common electrode voltage of each of liquid crystal display panel 1A and second liquid crystal display panel 1B of liquid crystal module 201 according to this embodiment will be described with reference to FIG. 9. FIG. 9 is a diagram for illustrating an electric charge eliminating step of eliminating an electric charge of alignment film 16 in the method of setting the common electrode voltage of each of first liquid crystal display panel 1A and second liquid crystal display panel 1B of liquid crystal module 201 according to Embodiment 2.

As with the method according to Embodiment 1 described above, the method of setting the common electrode voltage of each of first liquid crystal display panel 1A and second liquid crystal display panel 1B according to this embodiment includes an electric charge eliminating step of eliminating an electric charge of alignment film 16, and a voltage setting step of setting common electrode voltages of first liquid crystal display panel 1A and second liquid crystal display panel 1B by adjusting the common electrode voltages after the electric charge eliminating step.

In this embodiment, the electric charge eliminating step of eliminating an electric charge of the alignment film includes a first panel electric charge eliminating step of eliminating an electric charge of alignment film 16 of first liquid crystal display panel 1A and a second panel electric charge eliminating step of eliminating an electric charge of alignment film 16 of second liquid crystal display panel 1B.

In this embodiment, as shown in FIG. 9, in the electric charge eliminating step of eliminating an electric charge of alignment film 16, the first panel electric charge eliminating step (second step) is performed after the second panel electric charge eliminating step (first step).

Specifically, in the second panel electric charge eliminating step (first step), backlight 2 is turned on in a state where second liquid crystal display panel 1B is not driven (that is, in a state where second liquid crystal display panel 1B is not energized), thereby irradiating second liquid crystal display panel 1B with light of backlight 2.

According to the same principle as in Embodiment 1 described above, the electric resistance of alignment film 16 of second liquid crystal display panel 1B can be effectively reduced, so that electric charges of alignment film 16 of second liquid crystal display panel 1B can be eliminated. Specifically, in the second panel electric charge eliminating step, electric charges of alignment film 16 of only second liquid crystal display panel 1B among first liquid crystal display panel 1A and second liquid crystal display panel 1B are eliminated.

In this embodiment, the duration of the irradiation of second liquid crystal display panel 1B with light of backlight 2 is 1 hour. In addition, backlight 2 is fully turned on so that all the LED elements emit light, with the maximum power for driving liquid crystal display panel 1.

Note that, in the second panel electric charge eliminating step, dedicated driving circuit 210 is in the off state and is not activated. In the second panel electric charge eliminating step, in addition, first liquid crystal display panel 1A is also preferably not driven. In other words, first liquid crystal display panel 1A is preferably not energized.

After that, in the first panel electric charge eliminating step (second step), backlight 2 is turned on in a state where first liquid crystal display panel 1A is not driven and second liquid crystal display panel 1B is driven to perform white display, thereby irradiating first liquid crystal display panel 1A with light of backlight 2 through second liquid crystal display panel 1B.

In this step, only second liquid crystal display panel 1B among first liquid crystal display panel 1A and second liquid crystal display panel 1B is driven by turning on and activating dedicated driving circuit 210. By driving dedicated driving circuit 210 in this way, first liquid crystal display panel 1A that is not driven can be irradiated with the light of backlight 2 through second liquid crystal display panel 1B.

According to the same principle as in Embodiment 1 described above, the electric resistance of alignment film 16 of first liquid crystal display panel 1A can be effectively reduced, so that electric charges of alignment film 16 of first liquid crystal display panel 1A can be eliminated.

In this embodiment, the duration of the irradiation of first liquid crystal display panel 1A with light of backlight 2 is 1 hour. In addition, as in the second panel electric charge eliminating step, backlight 2 is fully turned on so that all the LED elements emit light, with the maximum power for driving first liquid crystal display panel 1A and second liquid crystal display panel 1B. Note that the duration of the irradiation of first liquid crystal display panel 1A and second liquid crystal display panel 1B with light can be appropriately adjusted based on the amount of light reaching first liquid crystal display panel 1A and second liquid crystal display panel 1B. For example, the duration of the irradiation of first liquid crystal display panel 1A with the light of backlight 2 may be longer than the duration of the irradiation of second liquid crystal display panel 1B with the light of backlight 2.

As described above, when eliminating electric charges of alignment film 16 of first liquid crystal display panel 1A by irradiating first liquid crystal display panel 1A with light of backlight 2 (that is, in the first panel electric charge eliminating step), dedicated driving circuit 210 used in this embodiment drives second liquid crystal display panel 1B to perform white display. Specifically, dedicated driving circuit 210 drives second liquid crystal display panel 1B so that the whole of image display area 1a of second liquid crystal display panel 1B performs white display. That is, a white image is displayed in image display area 1a of second liquid crystal display panel 1B.

After performing the electric charge eliminating step including the first panel electric charge eliminating step and the second panel electric charge eliminating step, the voltage setting step is performed. In the voltage setting step, the common electrode voltages of first liquid crystal display panel 1A and second liquid crystal display panel 1B are set by adjusting the common electrode voltages of first liquid crystal display panel 1A and second liquid crystal display panel 1B, respectively. Specifically, the common electrode voltage of each of first liquid crystal display panel 1A and second liquid crystal display panel 1B is set by adjusting the common electrode voltage so that the flicker is minimized.

In this embodiment, as in Embodiment 1 described above, after electric charges of alignment film 16 of each of first liquid crystal display panel 1A and second liquid crystal display panel 1B are eliminated, the common electrode voltage of each of first liquid crystal display panel 1A and second liquid crystal display panel 1B is set. That is, before setting the common electrode voltage of each of first liquid crystal display panel 1A and second liquid crystal display panel 1B, electric charges of alignment film 16 of each of first liquid crystal display panel 1A and second liquid crystal display panel 1B are eliminated.

In this way, in each of first liquid crystal display panel 1A and second liquid crystal display panel 1B, the common electrode voltage (set Vcom) set so that the flicker is minimized and the true optimal common electrode voltage (optimal Vcom) can be made to agree with each other. Therefore, in each of first liquid crystal display panel 1A and second liquid crystal display panel 1B, the shift of the common electrode voltage at which the flicker is minimized can be prevented.

As described above, the liquid crystal display device having two liquid crystal display panels would otherwise have a bad afterimage because of the shift of the common electrode voltage at which the flicker is minimized. According to this embodiment, however, since the shift of the common electrode voltage at which the flicker is minimized is prevented by eliminating electric charges of alignment film 16 of each of first liquid crystal display panel 1A and second liquid crystal display panel 1B, the afterimage on liquid crystal display device 200 can be effectively reduced even though liquid crystal display device 200 has two liquid crystal display panels, first liquid crystal display panel 1A and second liquid crystal display panel 1B.

Note that, although the second panel electric charge eliminating step of eliminating an electric charge of alignment film 16 of second liquid crystal display panel 1B is referred to as a first step, the first panel electric charge eliminating step of eliminating an electric charge of alignment film 16 of first liquid crystal display panel 1A is referred to as a second step, and the first panel electric charge eliminating step is performed after the second panel electric charge eliminating step in this embodiment, the present disclosure is not limited thereto. Specifically, the first panel electric charge eliminating step of eliminating an electric charge of alignment film 16 of first liquid crystal display panel 1A may be referred to as a first step, the second panel electric charge eliminating step of eliminating an electric charge of alignment film 16 of second liquid crystal display panel 1B may be referred to as a second step, and the second panel electric charge eliminating step may be performed after the first panel electric charge eliminating step.

In this regard, in this embodiment, since first liquid crystal display panel 1A is irradiated with the light of backlight 2 through second liquid crystal display panel 1B when eliminating electric charges of alignment film 16 of first liquid crystal display panel 1A, it is preferable that the elimination of charges of alignment film 16 of second liquid crystal display panel 1B is first performed, and the elimination of electric charges of alignment film 16 of first liquid crystal display panel 1A is then performed. That is, the first panel electric charge eliminating step is preferably performed after the second panel electric charge eliminating step as in this embodiment.

Note that, when second liquid crystal display panel 1B is of the normally white mode, the electric charge eliminating step and the voltage setting step for first liquid crystal display panel 1A and second liquid crystal display panel 1B of liquid crystal module 201 can be performed without dedicated driving circuit 210. In that case, the electric charge eliminating step and the voltage setting step for first liquid crystal display panel 1A can be performed at the same time as the electric charge eliminating step and the voltage setting step for second liquid crystal display panel 1B.

Variation of Embodiment 2

Next, a variation of Embodiment 2 will be described. In this variation, liquid crystal display device 200 and liquid crystal module 201 have the same configurations as those in Embodiment 2 described above except that liquid crystal display device 200 and liquid crystal module 201 do not have dedicated driving circuit 210.

This variation differs from Embodiment 2 described above in the manner of eliminating electric charges of alignment film 16 of each of first liquid crystal display panel 1A and second liquid crystal display panel 1B of liquid crystal module 201 having two liquid crystal display panels, first liquid crystal display panel 1A and second liquid crystal display panel 1B.

Specifically, although the elimination of electric charges of alignment film 16 of first liquid crystal display panel 1A and the elimination of electric charges of alignment film 16 of second liquid crystal display panel 1B are performed in different steps in Embodiment 2 described above, the elimination of electric charges of alignment film 16 of first liquid crystal display panel 1A and the elimination of electric charges of alignment film 16 of second liquid crystal display panel 1B are performed at the same time in this variation.

Figure 10:
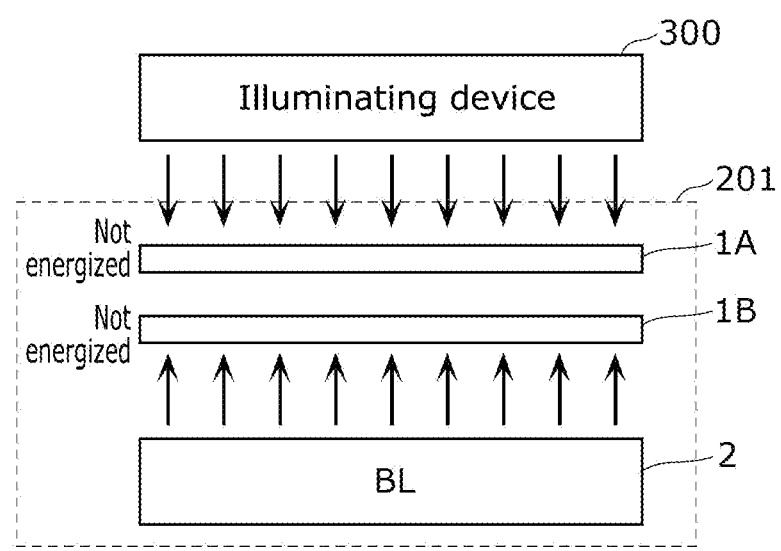
FIG. 10 is a diagram for illustrating an electric charge elimination step of eliminating an electric charge of an alignment film in a method of setting a common electrode voltage of each of a first liquid crystal display panel and a second liquid crystal display panel of a liquid crystal module according to a variation of Embodiment 2.
Figure 11:
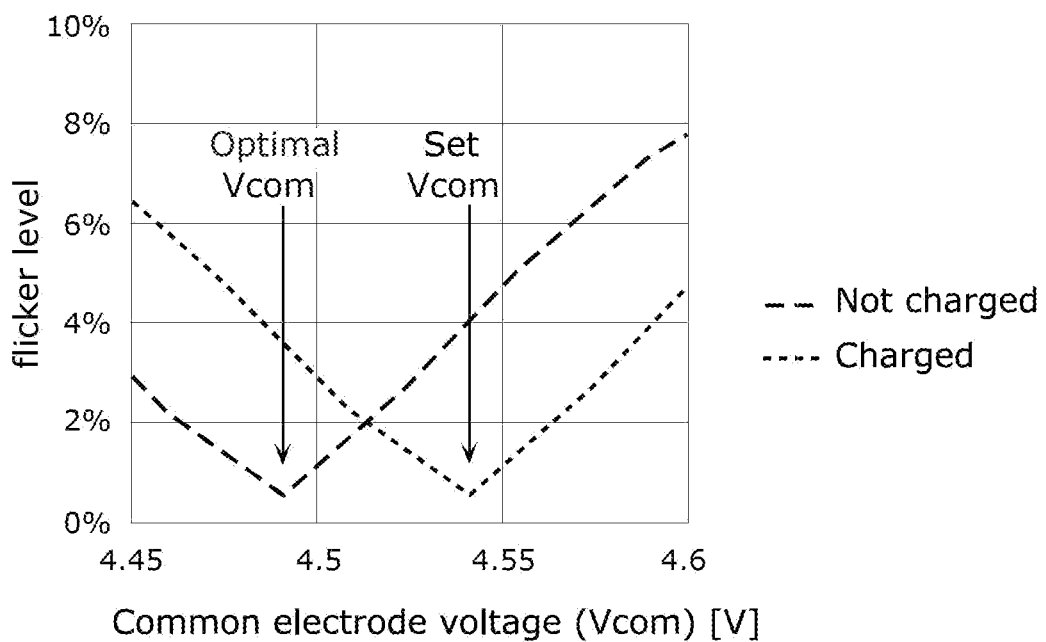
FIG. 11 is a graph showing relationships between a common electrode voltage and a flicker in cases where there is an electric charge in an alignment film and where there is no electric charge in the alignment film.
Figure 12:
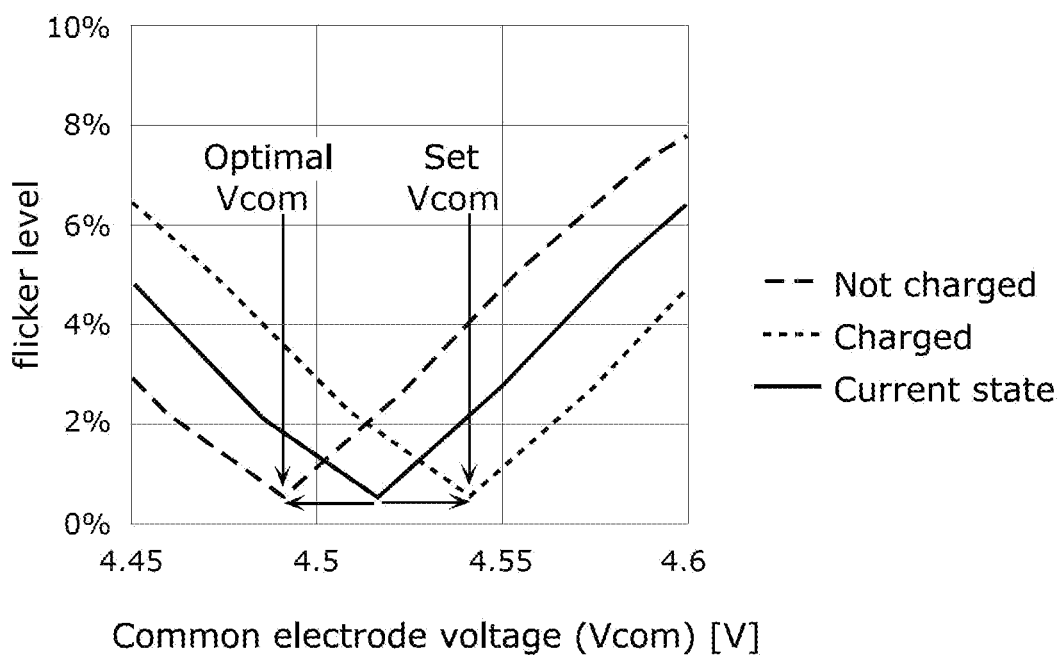
FIG. 12 is a graph for illustrating that a common electrode voltage at which the flicker is minimized is shifted because of an electric charge accumulated in the alignment film.

In the following, with reference to FIG. 10, a method of setting the common electrode voltage of each of first liquid crystal display panel 1A and second liquid crystal display panel 1B of liquid crystal module 201 according to this variation will be described. FIG. 10 is a diagram for illustrating an electric charge eliminating step of eliminating an electric charge of alignment film 16 in the method of setting the common electrode voltage of each of first liquid crystal display panel 1A and second liquid crystal display panel 1B of liquid crystal module 201 according to the variation of Embodiment 2.

As with the method according to Embodiment 2 described above, the method of setting the common electrode voltage of each of first liquid crystal display panel 1A and second liquid crystal display panel 1B according to this variation includes an electric charge eliminating step of eliminating an electric charge of alignment film 16 of each of first liquid crystal display panel 1A and second liquid crystal display panel 1B, and a voltage setting step of setting common electrode voltages of first liquid crystal display panel 1A and second liquid crystal display panel 1B by adjusting the common electrode voltages after the electric charge eliminating step.

In the electric charge eliminating step according to this variation, using illuminating device 300 for irradiating first liquid crystal display panel 1A with light, the elimination of electric charges of alignment film 16 of first liquid crystal display panel 1A and the elimination of electric charges of alignment film 16 of second liquid crystal display panel 1B are performed at the same time.

Specifically, in the electric charge eliminating step according to this variation, illuminating device 300, which is additionally disposed on the front side of first liquid crystal display panel 1A, is turned on in a state where first liquid crystal display panel 1A is not driven, thereby irradiating first liquid crystal display panel 1A with light of illuminating device 300 to eliminate electric charges of alignment film 16 of first liquid crystal display panel 1A, and backlight 2 is turned on in a state where second liquid crystal display panel 1B is not driven, thereby irradiating second liquid crystal display panel 1B with light of backlight 2 to eliminate electric charges of alignment film 16 of second liquid crystal display panel 1B.

In this way, in the electric charge eliminating step according to this variation, first liquid crystal display panel 1A is irradiated with light of illuminating device 300, which is additionally disposed on the front side of first liquid crystal display panel 1A, and second liquid crystal display panel 1B is irradiated with light of backlight 2 of liquid crystal module 201. In this way, first liquid crystal display panel 1A and second liquid crystal display panel 1B can be irradiated with light at the same time, and electric charges of alignment films 16 of first liquid crystal display panel 1A and second liquid crystal display panel 1B can be eliminated at the same time.

Note that illuminating device 300 used preferably has the same configuration as backlight 2. In this variation, illuminating device 300 and backlight 2 emit light of the same power, and the durations of illumination thereof is 1 hour. Although, in this case, illuminating device 300 and backlight 2 start illuminating at the same time and end illuminating at the same time, illuminating device 300 and backlight 2 may start illuminating at different times and end illuminating at different times.

For example, when first liquid crystal display panel 1A displays a color image, and second liquid crystal display panel 1B displays a monochromatic image, the light transmittance of first liquid crystal display panel 1A is lower than the light transmittance of second liquid crystal display panel 1B. In such a case, the power of illuminating device 300 can be set to be higher than the power of backlight 2. Alternatively, the duration of the irradiation of first liquid crystal display panel 1A with light can be set to be longer than the duration of the irradiation of second liquid crystal display panel 1B with light.

After performing the electric charge eliminating step including the first panel electric charge eliminating step and the second panel electric charge eliminating step, the voltage setting step is performed in the same manner as in Embodiment 2 described above. Specifically, in the voltage setting step, the common electrode voltages of first liquid crystal display panel 1A and second liquid crystal display panel 1B are set by adjusting the common electrode voltages of first liquid crystal display panel 1A and second liquid crystal display panel 1B, respectively so that the flicker is minimized.

In this variation, as in Embodiment 2 described above, after electric charges of alignment film 16 of each of first liquid crystal display panel 1A and second liquid crystal display panel 1B are eliminated, the common electrode voltage of each of first liquid crystal display panel 1A and second liquid crystal display panel 1B is set. In this way, in each of first liquid crystal display panel 1A and second liquid crystal display panel 1B, the common electrode voltage (set Vcom) set so that the flicker is minimized and the true optimal common electrode voltage (optimal Vcom) can be made to agree with each other. Therefore, in each of first liquid crystal display panel 1A and second liquid crystal display panel 1B, the shift of the common electrode voltage at which the flicker is minimized can be prevented.

In this variation, again, by preventing the shift of the common electrode voltage at which the flicker is minimized, the afterimage displayed on liquid crystal display device 200 can be effectively reduced.

Variations

Although liquid crystal display devices, liquid crystal modules, liquid crystal display panels, methods of setting a common electrode voltage of a liquid crystal display panel and the like according to the present disclosure have been described above with regard to embodiments, the present disclosure is not limited to the embodiments described above.

For example, the method of setting the common electrode voltage of the liquid crystal display panel according to the present disclosure has been described in embodiment 2 as being advantageous for a liquid crystal display device and a liquid crystal module having two liquid crystal display panels since the afterimage can be reduced, the present disclosure is not limited thereto. Specifically, from the viewpoint of reducing the afterimage, the method of setting the common electrode voltage of the liquid crystal display panel according to the present disclosure is also advantageous for a liquid crystal display device and a liquid crystal module that are capable of local dimming control. In the liquid crystal display device capable of local dimming control, the speed of the shift of the common electrode voltage at which the flicker is minimized differs between the white display part and the black display part since the liquid crystal display panel is partially irradiated with light, as with the liquid crystal display device having two liquid crystal display panels. Therefore, the liquid crystal display device capable of local dimming control has a substantially bad afterimage as with the liquid crystal display device having two liquid crystal display panels, even if the liquid crystal display device has only one liquid crystal display panel. For this reason, the methods of setting the common electrode voltage of the liquid crystal display panel according to the present disclosure described above with regard to Embodiments 1 and 2 are advantageous for a liquid crystal display device and a liquid crystal module that are capable of local dimming control. In particular, the methods are advantageous for a liquid crystal display device that has two liquid crystal display panels and is capable of local dimming control.

According to Embodiment 2 and the variation thereof described above, first liquid crystal display panel 1A displays a color image, and second liquid crystal display panel 1B displays a monochromatic image. However, the present disclosure is not limited thereto. For example, both first liquid crystal display panel 1A and second liquid crystal display panel 1B may display a monochromatic image. In that case, second substrate 20 of first liquid crystal display panel 1A does not have color filter layer 22, as with second liquid crystal display panel 1B.

Forms obtained by various modifications to the foregoing embodiments which may be conceived by a person of skill in the art and forms realized by combining structural components and functions in the respective embodiments without departing from the essence of the present disclosure are included in the present disclosure.

The invention claimed is:

1. A method of setting a common electrode voltage of a liquid crystal display panel in a liquid crystal module,
   the liquid crystal module including:
      the liquid crystal display panel including an alignment film; and
      a backlight disposed behind the liquid crystal display panel,
   the method comprising:
   eliminating an electric charge of the alignment film by turning on the backlight without driving the liquid crystal display panel to emit light of the backlight onto the liquid crystal display panel; and
   setting the common electrode voltage of the liquid crystal display panel by adjusting the common electrode voltage, after the eliminating of the electric charge.

2. The method of setting a common electrode voltage of a liquid crystal display panel according to claim 1, wherein
   the liquid crystal display panel comprises a plurality of liquid crystal display panels,
   the plurality of liquid crystal display panels include a first liquid crystal display panel and a second liquid crystal display panel disposed between the first liquid crystal display panel and the backlight,
   in the eliminating of the electric charge, an electric charge of an alignment film of the first liquid crystal display panel is eliminated by turning on an illuminating device disposed in front of the first liquid crystal display panel without driving the first liquid crystal display panel to emit light of the illuminating device onto the first liquid crystal display panel, and an electric charge of an alignment film of the second liquid crystal display panel is eliminated by turning on the backlight without driving the second liquid crystal display panel to emit the light of the backlight onto the second liquid crystal display panel, and
   in the setting of the common electrode voltage, a common electrode voltage of each of the first liquid crystal display panel and the second liquid crystal display panel is set by adjusting the common electrode voltage of each of each of the first liquid crystal display panel and the second liquid crystal display panel.

3. The method of setting a common electrode voltage of a liquid crystal display panel according to claim 1, wherein
   the liquid crystal display panel comprises a plurality of liquid crystal display panels,
   the plurality of liquid crystal display panels include a first liquid crystal display panel and a second liquid crystal display panel disposed between the first liquid crystal display panel and the backlight,
   the eliminating of the electric charge includes eliminating an electric charge of an alignment film of the first liquid crystal display panel and eliminating an electric charge of an alignment film of the second liquid crystal display panel,
   in the eliminating of the electric charge of the first liquid crystal display panel, the backlight is turned on in a state where the first liquid crystal display panel is not driven and the second liquid crystal display panel is driven so that the second liquid crystal display panel performs white display to emit the light of the backlight through the second liquid crystal display panel and onto the first liquid crystal display panel,
   in the eliminating of the electric charge of the second liquid crystal display panel, the backlight is turned on without driving the second liquid crystal display panel to emit the light of the backlight onto the second liquid crystal display panel, and
   in the setting of the common electrode voltage, a common electrode voltage of each of the first liquid crystal display panel and the second liquid crystal display panel is set by adjusting the common electrode voltage of each of each of the first liquid crystal display panel and the second liquid crystal display panel.

4. The method of setting a common electrode voltage of a liquid crystal display panel according to claim 3, wherein
   in the eliminating of the electric charge, the eliminating of the electric charge of the first liquid crystal display panel is performed after the eliminating of the electric charge of the second liquid crystal display panel.

5. The method of setting a common electrode voltage of a liquid crystal display panel according to claim 2, wherein
   the first liquid crystal display panel displays a colored image, and
   the second liquid crystal display panel displays a monochromatic image.

6. The method of setting a common electrode voltage of a liquid crystal display panel according to claim 2, wherein
   the first liquid crystal display panel displays a monochromatic image, and
   the second liquid crystal display panel displays a monochromatic image.

* * * * *